US005717161A

United States Patent [19]

Wakata

[11] Patent Number: 5,717,161

[45] Date of Patent: Feb. 10, 1998

[54] JUNCTION BOX

[75] Inventor: Shigekazu Wakata, Yokkaichi, Japan

[73] Assignee: Sumitomo Wiring Systems, Ltd., Japan

[21] Appl. No.: 747,537

[22] Filed: Nov. 12, 1996

Related U.S. Application Data

[63] Continuation of Ser. No. 237,017, Apr. 29, 1994, abandoned.

[30] Foreign Application Priority Data

May 8, 1993 [JP] Japan .................................... 5-131089

[51] Int. Cl.[6] ............................................ H02G 5/08

[52] U.S. Cl. ............................................ 174/50; 174/72 B

[58] Field of Search .................................. 200/50 A, 243; 361/616; 174/50, 70 B, 71 B, 72 B

[56] References Cited

U.S. PATENT DOCUMENTS

| | | | |
|---|---|---|---|
| 3,602,659 | 8/1971 | Egee et al. | 200/50 A |
| 3,657,606 | 4/1972 | Greger et al. | 317/112 |
| 3,917,371 | 11/1975 | Hirokawa et al. | 339/19 |
| 4,195,212 | 3/1980 | Graham et al. | 200/243 |
| 4,553,802 | 11/1985 | Ruehl | 339/74 R |
| 4,872,139 | 10/1989 | Okamoto et al. | 365/52 |
| 4,963,099 | 10/1990 | Sato et al. | 439/76 |
| 5,396,396 | 3/1995 | Watanabe | 361/212 |
| 5,406,449 | 4/1995 | Hicks et al. | 361/616 |

FOREIGN PATENT DOCUMENTS

| | | |
|---|---|---|
| 476654 | 3/1992 | European Pat. Off. . |
| 2094370 | 2/1972 | France . |
| 7837934 | 3/1979 | Germany . |

*Primary Examiner*—Kristine L. Kincaid
*Assistant Examiner*—Dean A. Reichard
*Attorney, Agent, or Firm*—Jordan B. Bierman; Bierman, Muserlian and Lucas

[57] ABSTRACT

This invention provides a junction box which can easily bridge and separate terminal portions of conductive plates provided in the box. Bus bars (2) are arranged vertically and in parallel in the box. A cover (1) of the box is provided with an opening (3) which is closed and opened with a lid (5). A shorting terminal (9) is mounted by guides (18) on a rear side of the lid (5) slidably in a direction of bridging the bus bars (2). The shorting terminal (9) has contact portions (11) which are spaced from each other by the same distance as that existing between the bus bars (2) and adapted to elastically clamp the bus bars (2). the shorting terminal is accommodated in a casing (13). When the lid (5) is closed, each bus bar (2) enters into the corresponding contact portion (11) of the shorting terminal (9) to close the shorting circuit. When the lid (5) is opened, the bus bar (2) leaves from the contact portion (11) to open the shorting circuit.

3 Claims, 4 Drawing Sheets

JUNCTION BOX

This application is a continuation of application Ser. No. 08/237,017, filed Apr. 29, 1994, now abandoned.

BACKGROUND OF THE INVENTION

1. Field of the Invention

This invention relates to a junction box to be used for internal wiring in a motive vehicle and the like and more particularly to an improvement of a shorting construction of conductive plates in the box.

2. Statement of the Prior Art

It is often necessary in such a junction box to draw and insert a shorting terminal from and into terminal portions of conductive plates which constitute a shorting circuit upon, for example, inspecting it. Heretofore, at such a time, the shorting terminal is drawn out from the terminal portions after a lid mounted on a top wall of a box body is opened and the shorting terminal is inserted into the portions again after inspection. Then, the lid is closed.

That is, heretofore, the inspecting process of the shorting circuit was troublesome because the shorting terminal had to be drawn and inserted manually in addition to opening and closing the lid. As a result it may be dropped by accident into a confined space due to its small size.

SUMMARY OF THE INVENTION

An object of the present invention is to provide a junction box which can easily bridge and separate terminal portions of conductive plates provided in a box body.

In order to achieve the above object, a junction box of the present invention comprises: a box body having an opening; a lid pivotably mounted on said box body to close and open said opening; metal conductive plates provided in said box body for constituting an electrical circuit, each plate being provided with a terminal portion; and a shorting terminal for bridging said terminal portions when said lid closes said opening.

In the junction box, the terminal portions of said conductive plates may be arranged to be perpendicular to said opening. The shorting terminal may be mounted on said lid movably in a direction in which said terminal portions are arranged.

Also, the terminal portions of said conductive plates may be arranged along said opening. The lid may be provided with springs which push said shorting terminal to said conductive plates.

In the junction box of the present invention, when the lid is opened, the shorting terminal mounted on the rear side of the lid exits from the terminal portions of the conductive plates to separate the contact portions. When the lid is closed, the shorting terminal contacts with the terminal portions of the conductive plates to bridge the terminal portions.

Since the shorting terminal can be moved on the lid, the terminal Is precisely positioned in opposition to the terminal portions. Consequently, the shorting terminal can engage with and disengage from the terminal portions of the conductive plates upon closing and opening the lid.

When the lid is closed, the shorting terminal is pushed onto the terminal portions of the conductive plates by an elastic force of the spring to maintain a contacting condition.

According to the present invention, it is possible to carry out an engagement and disengagement of the shorting terminal with the terminal portions of the conductive plates simultaneously with being closed and opened, thereby enabling ready inspection. It is also possible to avoid accidental dropping of the shorting terminal since it is mounted on the lid.

In the case that the terminal portions of the conductive plates are arranged in a direction perpendicular to the opening in the cover, it is possible to precisely position the shorting terminal by displacing it on the lid, even if any errors occur in arranging the direction and position of the terminal portions.

In the case that the terminal portions of the conductive plates are arranged in parallel with the opening in the cover, the shorting terminal is positively pushed onto the terminal portion by the spring, even if any errors occur in an arranging position in a direction perpendicular to the opening.

DETAILED DESCRIPTION OF THE PREFERRED EMBODIMENTS

Figure 1:
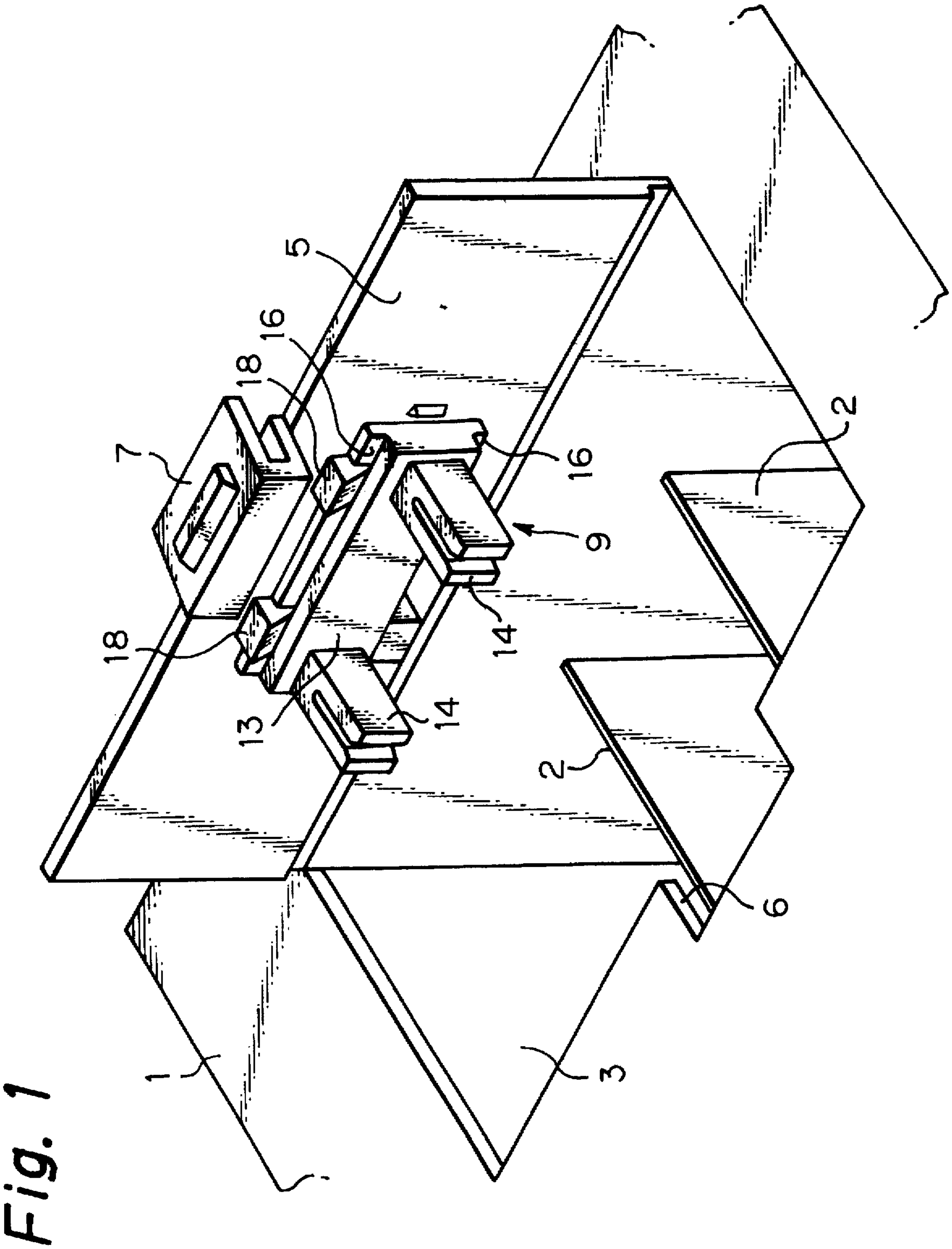
FIG. 1 is a perspective view of a first embodiment of a junction box in accordance with the present invention.
Figure 2:
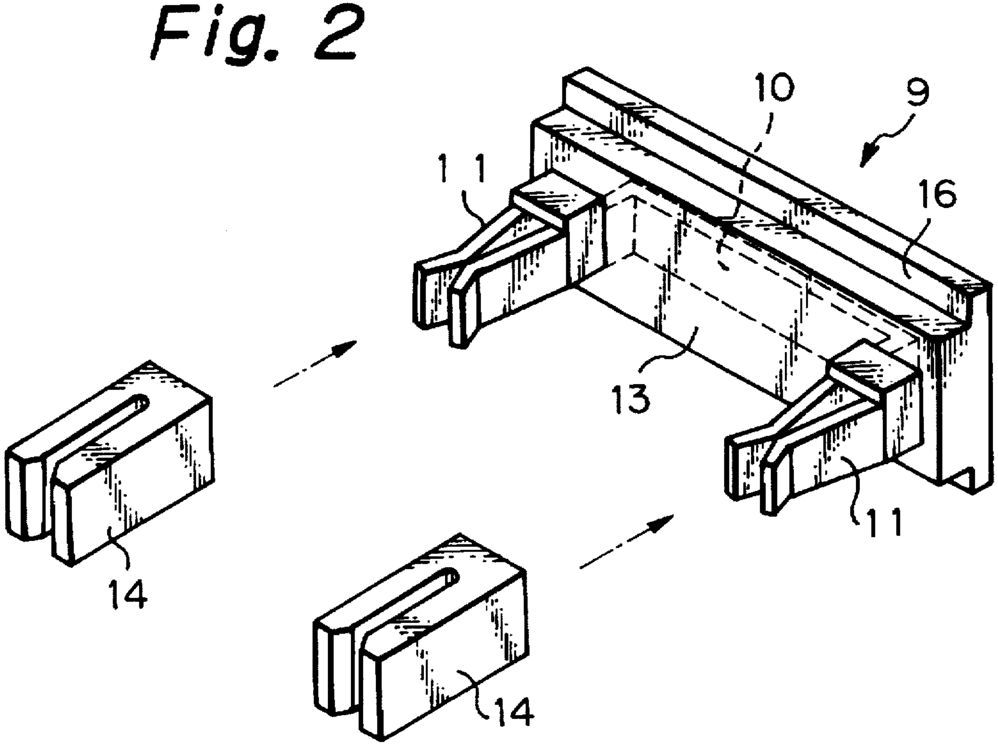
FIG. 2 is an exploded perspective view of parts on a side of a shorting terminal.
Figure 3:
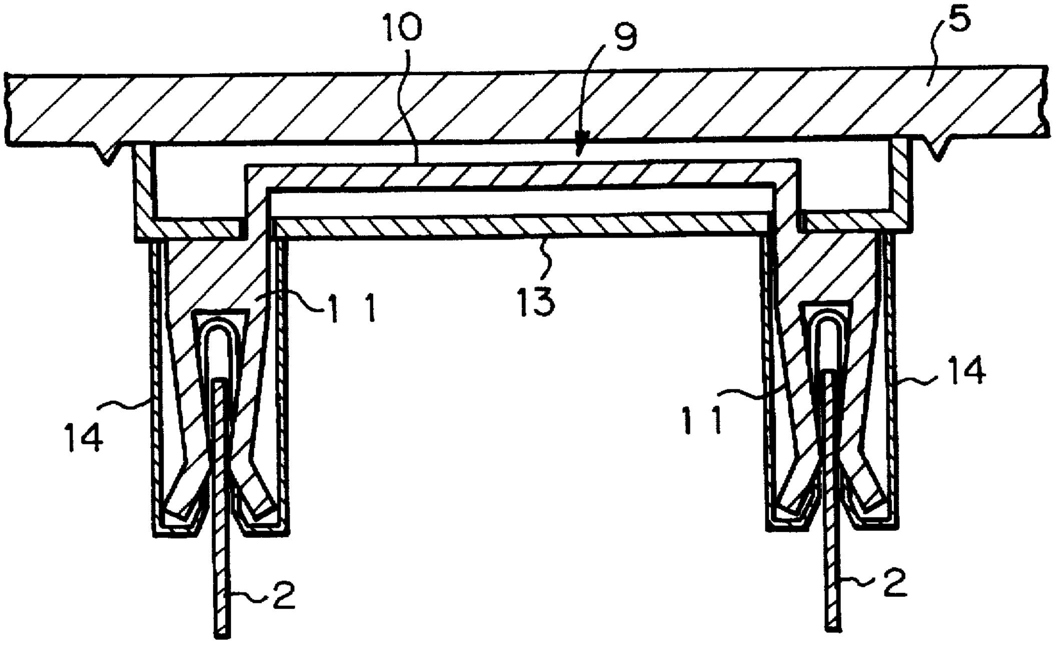
FIG. 3 is a cross sectional view of the shorting terminal shown in FIG. 2, illustrating a position in which the terminal is connected to bus bars.

A first embodiment of a junction box in accordance with the present invention will be described by referring now to FIGS. 1 through 3. A box like cover 1 opening downwardly is mounted on a top wall of a box body in which conductive plates constituting an electrical circuit are provided. In this embodiment, a pair of bus bars 2 which act as terminal portions constituting a shorting circuit in the box body are arranged in a direction perpendicular to the top wall of the cover 1 and spaced from each other at a certain distance horizontally.

The cover 1 is provided on the top wall with an opening 3 above the bus bars 2. A lid 5 is pivotably attached to one side edge of the opening 3 to close and open it. The opening 3 is provided on the other side edge with a recess 6. When the lid 5 is turned downwardly, a lock piece 7 on the lid engages with the recess 6 to maintain the lid 5 at a closing position. If the lock piece 7 is released from the recess 6, the lid 5 can be opened.

A shorting terminal 9 is attached to a rear side of the lid 5. As shown in FIGS. 2 and 3, the shorting terminal 9 is made of a conductive material and has an oblong shorting portion 10. A contact portion 11 which is adapted to elastically clamp the bus bar 2 is provided on each end of the shorting portion 10. The contact portions 11 extend from the shorting portion 10 in perpendicular and are spaced from each other by the same distance as that between the bus bars 2. The shorting portion 10 is accommodated in a casing 13 made of a synthetic resin material with the contact portions 11 projecting outwardly from the casing 13. A protective cap 14 made of a synthetic resin material is mounted on each contact portion 11 not to prevent the portion 11 from electrically contacting with each bus bar 2.

Two sets of hooked guides 18 are provided on the rear side of the lid 5 in an arranging direction of the bus bars 2. Stepped portions 16 formed on opposite lower sides of the casing 13 for the shorting terminal 9 are tightly inserted between the guides 18.

In order to attach the shorting terminal 9 to the lid 5 in the first embodiment, the stepped portions 16 of the casing 13 are inserted between the guides 18 so that the contact portions 11 of the shorting terminal 9 are opposed to the bus bars 2.

When the lid 5 is closed, each bus bar 2 is inserted into and clamped tightly in the corresponding shorting terminal 9, thereby closing the shorting circuit. On the contrary, upon inspecting the circuit the lid 5 is opened and then the bus bars 2 are drawn from the contact portions 11 of the shorting terminal 9, thereby opening the shorting circuit.

According to this embodiment, it is possible to carry out processes of attaching and detaching the shorting terminal 9 to and from the bus bars 2 by merely opening and closing the lid 5 from and to the cover 1. The shorting terminal 9 is not missed during handling the lid 5 since the terminal 9 is accommodated in the casing 13.

It is also possible to precisely position the contact portions 11 of the shorting terminal 9 relative to the bus bars 2, even if there are any errors in arrangement of the bus bars 2 and the cover 1, since the casing 13 is movable in the direction of the bus bar array.

The first embodiment may be altered by accommodating each contact portion 11 of the shorting terminal 9 in an individual casing, coupling the contact portions with each other by a conductive member such as a wire in lieu of the shorting portion 10, and mounting the contact portions 11 on the lid 5 so that a distance between the portions 11 is adjustable. Thus, even if any error occurs in a distance between the bus bars 2, it may be readily cancelled.

Figure 4:
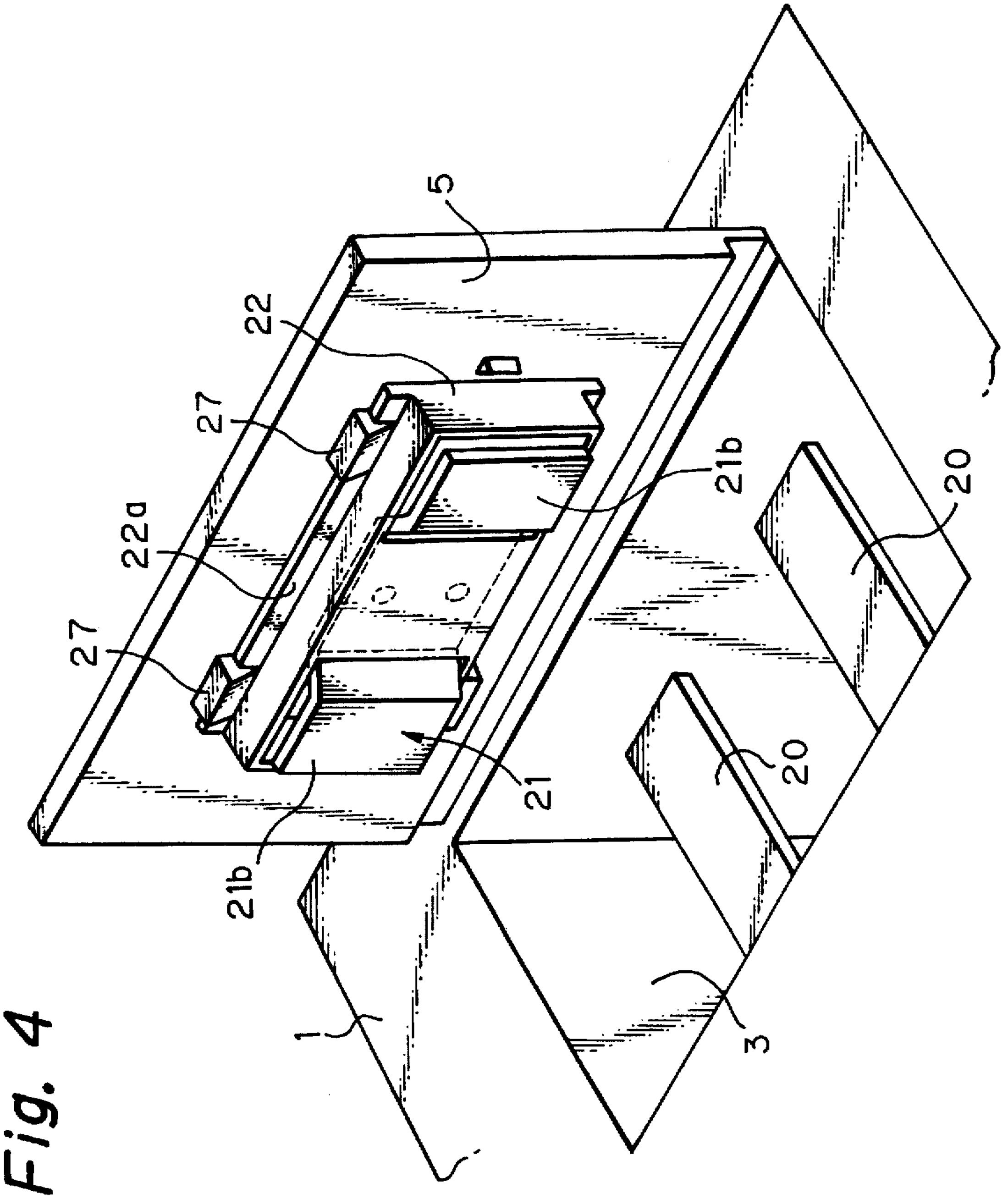
FIG. 4 is a perspective view of a second embodiment of the junction box of the present invention.
Figure 5:
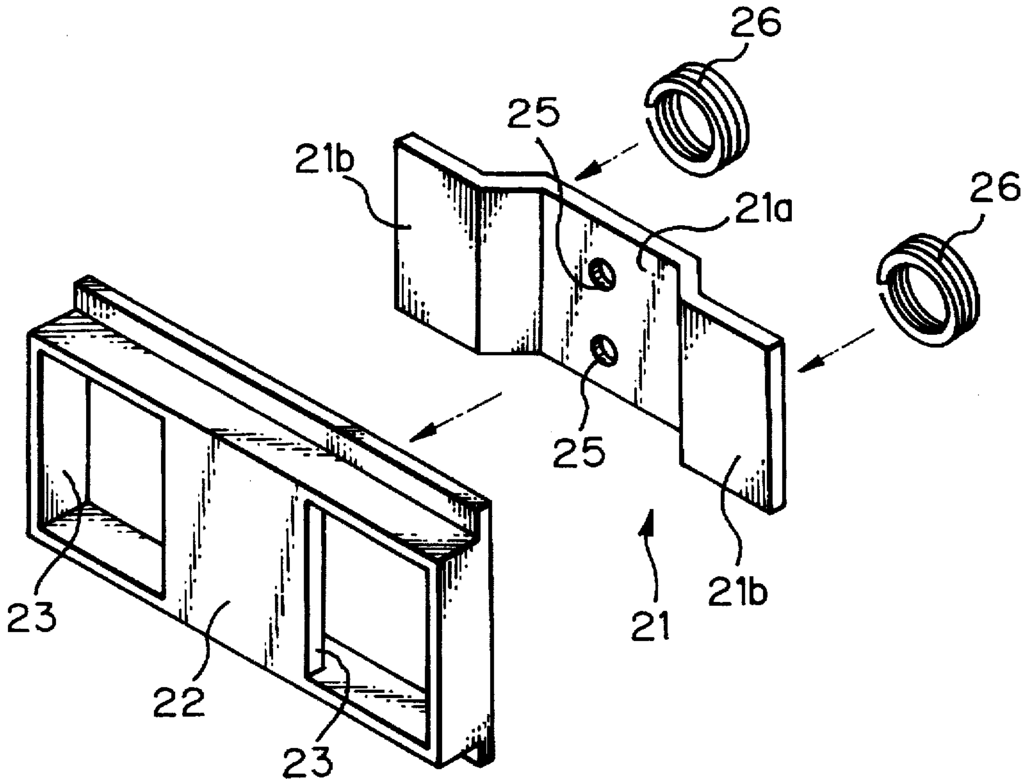
FIG. 5 is an exploded perspective view of parts on a side of a shorting terminal.
Figure 6:
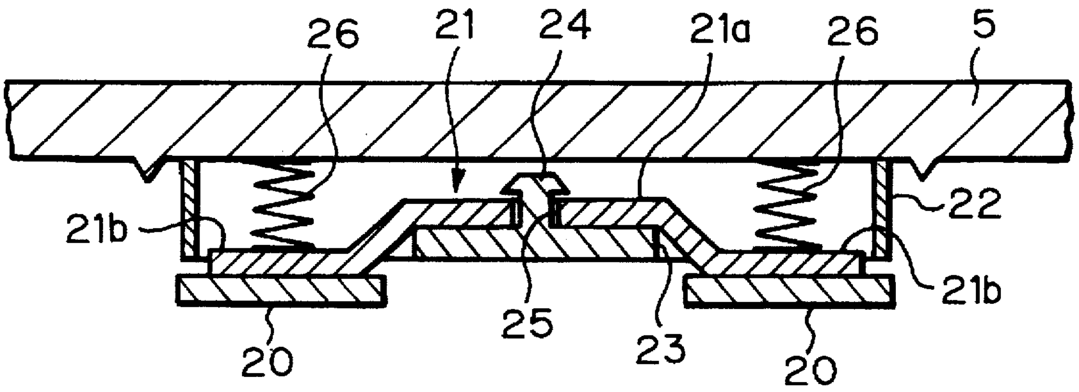
FIG. 6 is a cross sectional view of the shorting terminal shown in FIG. 5, illustrating a position in which the terminal is connected to bus bars.

FIGS. 4 through 6 show a second embodiment of the junction box of the present invention. As shown in FIG. 4, in the second embodiment bus bars 20 are arranged horizontally alone the top wall of the cover 1.

A shorting terminal 21 in this embodiment, as shown in FIG. 5, is made of an elongated conductive plate a center portion of which is bent backwardly from opposite end portions. The center portion serves as an attaching portion 21*a* while the opposite end portions serve as a pair of contact portions 21*b*.

A casing 22 for accommodating the shorting terminal 21 is made of a synthetic resin material and provided on opposite ends of a front side with windows 28 which receive the contact portions 21*b*. Two attaching pins 24 (see FIG. 6) provided on the center portion of the casing 22 pass through apertures 25 formed in the attaching portion 21*a*, thereby retaining the shorting terminal 21 to the casing 22. Thus, the shorting terminal 21 is movably attached to the casing 22 so that the terminal 21 can be moved within a certain distance in a direction perpendicular to the portion 21*a* in the casing 22 by means of a guiding action of the attaching pins 24. Compression coil springs 28 are disposed between the contact portions 21*b* of the shorting terminal 21 and the lid 5.

The casing 22 for the shorting terminal 21 is attached to the rear side of the lid 5 in opposition to the bus bars 20 by inserting stepped portions 22*a* formed on opposite lower sides of the casing 22 between pawls 27 projecting outwardly from the rear side of the lid 5 while the compression coil springs 26 are being compressed. Then, the contact portions 21*b* of the shorting terminal 21 project from the windows 23 in the casing 22 by means of an elastic force of the coil spring 26.

In the second embodiment, when the lid 5 is closed, the contact portions 21*b* of the shorting terminal 21 are pressed onto the bus bars 20 against the compression coil spring 26, thereby closing the shorting circuit, as shown in FIG. 6. When the lid 5 is opened, the shorting terminal 21 is spaced away from the bus bars 20, thereby opening the shorting circuit.

According to the second embodiment, it is also possible to carry out the processes of attaching and detaching the shorting terminal 21 to and from the bus bars 20 in connection with operations of opening and closing the lid 5. In addition, since the shorting terminal 21 is biased by the compression coil springs 26 to project forwardly from the casing 22, even if there is any error in a vertical position of the bus bars 20, the error is cancelled by the spring action so that the shorting terminal 21 can positively contact with the bus bars 20.

What is claimed is:

1. A junction box comprising:

a box body having an opening;

a lid pivotably mounted on said box body to close and open said opening;

metal conductive plates provided in said box body for constituting an electrical circuit, each plate being provided with a terminal portion;

a shorting terminal in the form of an elongated conductive plate with a center portion bent back from opposite end portions acting as a pair of contact points for bridging said terminal portions when said lid closes said opening, a casing provided with attaching pins on a center portion thereof accommodating said shorting terminal and a compression coil spring between said casing and said shorting terminal.

2. A junction box according to claim 1, wherein said terminal portions of said conductive plates are arranged in perpendicular to said opening, and wherein said shorting terminal is mounted on said lid movably in a direction in which said terminal portions are arranged.

3. A junction box according to claim 1 wherein said terminal portions of said conductive plates are arranged along said opening.

* * * * *